Nov. 24, 1942.   J. H. GETTIG   2,303,266
METHOD OF MAKING AXLE HOUSINGS
Filed Dec. 29, 1939   2 Sheets-Sheet 1
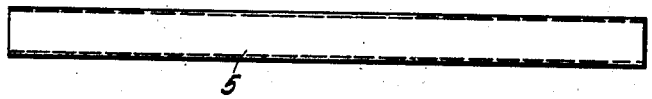
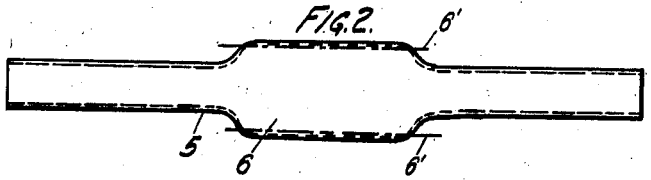
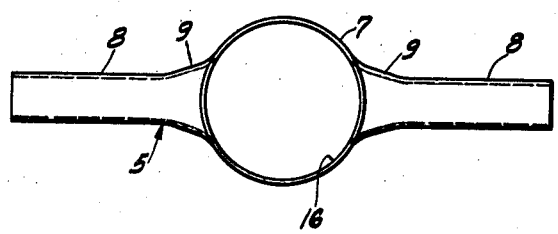
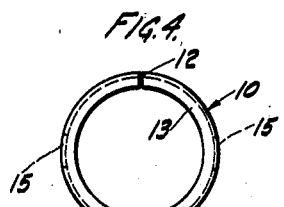   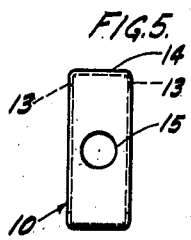
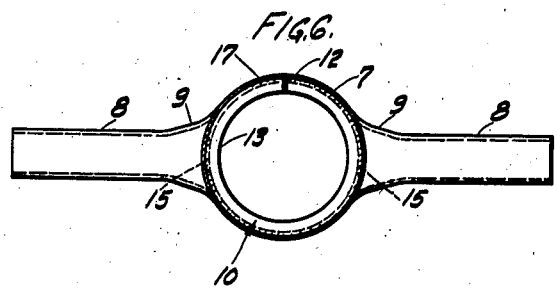
INVENTOR.
JOSEPH H. GETTIG.
BY Walter E. Schirmer
ATTORNEY.

Nov. 24, 1942.   J. H. GETTIG   2,303,266
METHOD OF MAKING AXLE HOUSINGS
Filed Dec. 29, 1939   2 Sheets-Sheet 2
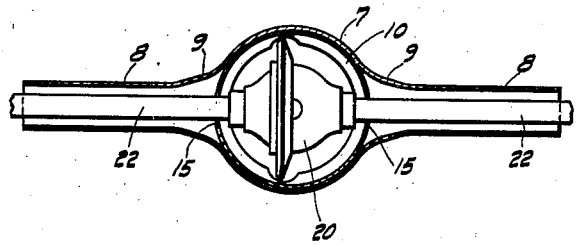
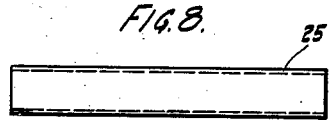 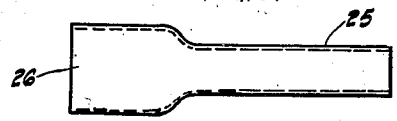
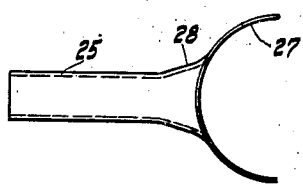 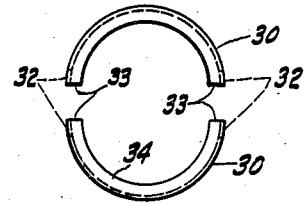
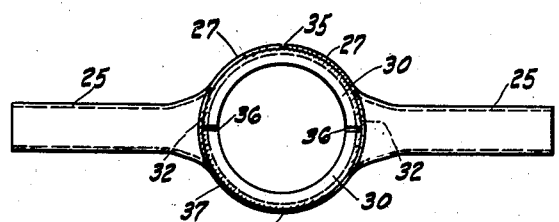
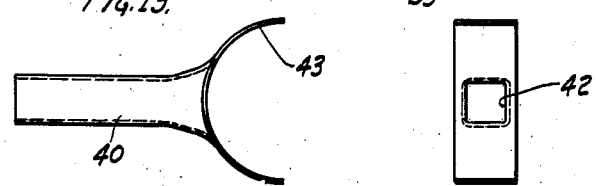 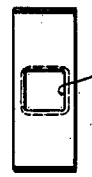
INVENTOR.
JOSEPH H. GETTIG.
BY Walter E. Schirmer
ATTORNEY.

UNITED STATES PATENT OFFICE 2,303,266

METHOD OF MAKING AXLE HOUSINGS

Joseph H. Gettig, Buchanan, Mich., assignor to Clark Equipment Company, Buchanan, Mich., a corporation of Michigan Application December 29, 1939, Serial No. 311,484

4 Claims. (Cl. 29—153.1)

This invention relates to methods of making axle housings, and more particularly is directed to the forming of rear axle housings for automotive vehicles, trucks and busses, the housings being generally known as those of the banjo type in which an enlarged cylindrical banjo frame portion is provided centrally of the housing arm to receive the differential carrier.

Axle housings of this general type are well known, and various ways have been devised for manufacturing the same, either by pressing or stamping sections of the housing and then welding the same together to form the completed housing, or by forming the same from a single tubular blank, such as the process described in Spatta patent, Reissue No. 20,103, issued September 8, 1936. In that patent the central portion of the tubular blank is slotted and then expanded to form a circular enlarged section, and during the expanding operation, radially inturned flanges are formed to provide the bolting flanges by which the differential carrier and the backing plate are secured to this frame. The expanding operation in this form of making the housing requires a great deal of skill, and it has been found that the flanges thus formed must be reinforced or strengthened by welding reinforcing rings to the faces thereof to provide sufficient material for tapping the bolt openings therein. This is due to the fact that the metal is stretched during the forming operation, and when folded and bent, is reduced in thickness to an extent such that the reinforcing rings are necessary.

In other forms of making the invention, it is necessary that the stampings be of sufficient section to provide the desired banjo flange thickness or additional reinforcing rings are also required even in the stamped or pressed type of welded or built-up housing.

It is also essential in the forming of banjo housings of previous types, when formed from tubular blanks, that after the formation of the banjo frame portion, the extending arm portions of the housing be swaged down to provide increased wall thickness and smaller diameter. This is essential since a large diameter blank is employed to afford sufficient metal for the banjo forming operation, and this blank must then necessarily be reduced in the arm portions. This introduces other serious difficulties when it is desired to form arm sections of polygonal shape rather than straight cylindrical arm portions, as various types of swaging dies must then be employed to produce this result, The present invention departs from the teachings of previous developments in providing for the formation in a tubular blank of a cylindrical hoop section having no radially inturned flanges, which hoop section can thereby be formed starting with a blank originally having the proper arm diameter and wall thickness as it is not necessary to provide for the additional metal necessary to the forming of the banjo flanges. When the cylindrical section has been formed centrally of the banjo, there is inserted therein a channel-shaped ring rolled out of stock of the requisite size to provide proper thickness of the banjo flanges, which ring is welded within the circular frame of the housing blank and thereby provides the banjo section having radially inturned flanges of sufficient thickness to afford proper depths of the bolt openings by which the differential carrier is secured to the banjo. The channel shaped ring thus formed is provided with oppositely punched openings of a diameter just large enough to receive the axle shafts of the drive axle assembly. By reason of this construction an additional advantage is secured in that the openings are disposed substantially in the axial plane of the housing arms whereby the lubricant in the differential is not allowed to escape until centrifugal force has raised it substantially to the height of the axle shaft. This prevents this lubricant running out through the housing arms, and eliminates the necessity of providing seals within the housing arms.

The present invention also contemplates the forming of an axle housing by using short tubular blanks which are flattened and expanded at the adjacent ends to form semi-circular arcuate sections. Two such sections are then butt welded together providing the blank with a cylindrical intermediate section in which is disposed the channel-shaped ring. It is also within the purview of the present invention that the ring may be formed of two pieces which may comprise stampings or the like forming channel-shaped semi-cylindrical sections which are inserted into the cylindrical center ring of the banjo housing and welded in position to provide the complete assembly.

Inasmuch as the arm sections of a housing constructed in this manner do not have to be swaged or rolled in order to reduce the diameter thereof, it is apparent that the initial blank may be formed as a polygonal tubular member and the arcuate ends then formed therein whereby a housing can be formed with polygonally shaped arms which require no special swaging or forming operations after the blank has been initially expanded to provide the banjo frame portion.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is an elevational view of a tubular blank having a diameter corresponding to the final diameter desired in the arm portions of the axle housing;

Figure 2 is a view corresponding to Figure 1 showing the spreading and shearing of the central portion of the blank;

Figure 3 is a corresponding view after the next succeeding expanding operation which forms the cylindrical hoop section in the center of the blank;

Figure 4 is an elevational view of the channel-shaped ring which is to be inserted into the cylindrical frame portion of the blank;

Figure 5 is an end view of the ring shown in Figure 4;

Figure 6 is an elevational view of the housing after the banjo has been completed;

Figure 7 is a diagrammatic view, partly in section, showing the arrangement of the differential and axle shafts in an axle housing of the present invention;

Figure 8 is an elevational view of the blank used when a two-piece housing is to be formed;

Figure 9 shows the slotting of the end of the blank shown in Figure 8;

Figure 10 illustrates the manner in which the slotted end is expanded to form a semi-circular hoop section;

Figure 11 shows channel-shaped stampings which may be secured together to form the inserted ring for the banjo frame;

Figure 12 shows an axle housing assembly as formed from the blanks shown in Figure 8;

Figure 13 illustrates a modified construction corresponding to Figure 10; and

Figure 14 is an end elevational view of the structure shown in Figure 13.

Referring now in detail to the drawings, the blank 5 shown in Figure 1 is preferably of cylindrical form and of a diameter corresponding to the final diameter desired in the housing arms. This blank may be formed of seamless stock, or may be rolled up from flat plate and welded, as described in Patent No. 2,160,586, issued to George Spatta and myself on May 30, 1939. This blank is first flattened or spread in any desired manner, as by rolling to increase the lateral area and reduce the wall thickness. The folded edges of this portion 6 are then sheared off along the dotted lines 6′ to provide two flattened wall portions, similar to the process described in my Patent No. 2,133,092, issued October 11, 1938. The next succeeding operation comprises inserting suitable die means into the slots 6 to expand this portion of the blank into the cylindrical hoop section 7, which is of a thickness substantially less than the thickness of the arm portions 8, and which are joined to the arm portions by frusto-conical sections 9. The forming operation is preferably carried on in such manner that a smooth cylindrical section is provided entirely around and through the throat portions 9, these portions being opened to the interior of the arms 8.

In order to provide flanges in the banjo frame and to strengthen the same, a channel-shaped ring 10 is provided shown generally in Figures 4 and 5. This ring can be formed by rolling up channel-shaped stock and butt welding adjacent ends 12, thereby providing a closed ring having the parallel inturned flange portions 13 separated by the annular web portion 14. The ring 10 is also provided with the diametrically opposed openings 15 formed in the web portions 14 thereof on opposite sides of the weld 12, which are adapted to receive the axle shafts.

After the ring has been thus formed, it is inserted within the opening 16 formed by the cylindrical hoop section 7 and welded thereto as indicated by the weld line 17 in Figure 6. This completes the forming of the banjo portion of the axle housing, and the ends of the arms thereof may then be radially expanded and flanged to provide internal bearing seats for semi-floating axles, or may be swaged down and thickened to provide wheel bearing seats for axles of the full floating type.

The provision of the openings 15 in the ring 10 is of distinct advantage in eliminating the necessity of grease stops in the housing arms, as is clearly shown in Figure 7. It will be apparent that the grease in which the differential 20 operates has a tendency, upon turning of the vehicle, to be centrifugally thrown into one or the other of the housing arms 8 through the frusto-conical portions 9. However, by the provision of the ring 10 with the openings 15 which closely fit the axle shafts 22, an effective grease stop is provided which prevents this lubricant from normally being allowed to flow outwardly through one or the other of the housing arms by centrifugal force, inasmuch as the level of the lubricant must build up to an appreciably higher point before it reaches the openings 15 and only a small annular gap is provided at these openings as they are of a diameter just sufficient to clear the inner splined ends of the axle shafts when the shafts are withdrawn or inserted therethrough. It will be apparent that the provision of the two ring sections 7 and 10 provide a banjo frame of great rigidity and strength which has radially inturned flanges of sufficient thickness so that no reinforcing rings or the like are necessary. Also, the welding operations for securing the ring 10 within the circular frame 7 are relatively simple and may be carried out by means of machines corresponding to those shown in the patent to George Spatta, No. 2,178,350, issued October 31, 1939.

In the embodiment of the invention shown in Figures 8 to 12, inclusive, I preferably provide tubular blanks 25 which are of a substantially smaller axial extent than the blanks 5 of the previous embodiment of the invention. However, the blanks 25 are also of a diameter corresponding to the final arm diameter desired in the completed housing, and are preferably flattened at one end as shown at 26, this flattened portion being then sheared at the edges to provide a double walled portion of increased area and decreased thickness. The end 26 of the blank is then expanded into a substantially semi-cylindrical form, as indicated at 27 in Figure 10, being joined to the main portion of the blank 25 through a frusto-conical throat portion 28 which provides an opening through the blank into the interior of the semi-cylindrical portion 27.

In place of using the ring shown in Figures 4 and 5, I may, if desired, employ a two-piece ring which may be stamped or otherwise formed to provide two semi-cylindrical segments 30, as shown in Figure 11, each provided with a semi-cylindrical opening 32 in the end portions thereof whereby, when the two sections are welded on the adjacent ends 33, the openings 32 define cylindrical openings corresponding to the openings 15 of the ring 10. These segments 30 each provide the parallel radially inturned flanges 34 for bolting the differential carrier to the banjo frame, and also for securing the back plate to the opposite face thereof.

To assemble a housing such as provided by two blanks 25 and two ring segments 30, a suitable fixture may be provided for holding the two blanks 25 in position with their arcuate semi-cylindrical ends 27 in abutting engagement, whereby the ends of the portions 27 may be welded together, as indicated at 35, to provide a blank corresponding to that shown in Figure 3. At the same time, the ring segments 30, which have been previously welded together, are inserted therebetween and held in the same fixture so that they may be welded together as indicated at 36, and may also be welded to the semi-cylindrical portions 27 of the blanks as indicated by the weld line 37.

This provides a very rigid and sturdy section in the banjo portion of the housing, and with the ring segments and semi-cylindrical end portions all welded together, the housing has the same strength and characteristics as the housing shown in Figure 6, and the openings 32 therein serve the same function as the openings 15.

In Figures 13 and 14, a modified form of blank is provided. In this form of blank, indicated at 40, the arm portion is of substantially square section providing a substantially square passageway therethrough, as indicated at 42. It is to be understood that in place of being square, this may be polygonal, or of any form other than the straight cylindrical section described in connection with the blanks of Figures 1 and 8. When a half blank of the type shown at 40 is to be employed, the end may be slotted and expanded to provide the semi-cylindrical portion 43, the same as described in connection with Figures 9 and 10. Two such portions may then be welded together with a ring inserted therein, as described in connection with Figure 12. Such a form of housing may be employed without requiring special swaging operations or rolling operations, inasmuch as the arm portions do not have to be further formed or operated upon subsequent to the formation of the banjo center, and consequently the blank may be furnished with the desired shape and wall thickness in the arm portion. This eliminates these further operations which consume time and are expensive. It is to be understood, of course, that a complete blank of polygonal section may be provided corresponding to the blank 5 with the center thereof expanded into cylindrical form, if so desired.

I am aware that various changes may be made in certain details of the construction and method herein shown and described, and I therefore do not intend to be limited except as defined by the scope and spirit of the appended claims.

I claim:

1. A method of making an axle housing of the banjo type which comprises, providing a tubular blank of a size corresponding to that desired in the arm portions of the finished housing, expanding the blank laterally intermediate the ends thereof to form a cylindrical hoop section, forming a channel-shaped ring with the side flanges turned radially inwardly, inserting said ring into said hoop section, and welding the ring to the annular lateral edges of said hoop section.

2. The method of making a banjo type axle housing from a tubular blank which comprises, flattening said blank longitudinally intermediate its ends, shearing the edges of said flattened portion, expanding said flattened portion into a cylindrical hoop section, forming a channel-shaped ring having radially inturned parallel side flanges, and securing said ring within said hoop section to complete the banjo frame.

3. The method of forming a banjo type axle housing which comprises, forming a tubular blank having a diameter and wall thickness corresponding to that desired in the arm portion of the finished housing, expanding one end of said blank into a semi-cylindrical surface having a radius substantially equal to the radius desired in the banjo, butting two such formed blanks together to form a central cylindrical hoop section, stamping two semi-cylindrical channel-shaped ring sections, welding said sections into a ring, inserting said ring into said hoop section with the joints thereof disposed out of alinement with said hoop joints, butt welding said hoop joints, and welding said ring to the lateral edges of said hoop section.

4. In the method of forming an axle housing having oppositely extending tubular arms and a central banjo section comprising a transverse cylindrical hoop into which said arms open at diametrically opposite portions, the novel steps comprising forming a cylindrical ring having radially inturned edge flanges, forming diametrically opposed openings in the web of said ring, inserting said ring laterally into said hoop with said openings in alinement with said arms, and welding said ring to the defining edges of said hoop.

JOSEPH H. GETTIG.